United States Patent [19]

Ashizawa et al.

[11] Patent Number: 4,956,226
[45] Date of Patent: Sep. 11, 1990

[54] RUBBER-COATED GASKET

[75] Inventors: Masaaki Ashizawa; Kazuo Nishimoto, both of Kanagawa; Hiroshi Saito, Tokyo, all of Japan

[73] Assignee: Nichias Corporation, Tokyo, Japan

[21] Appl. No.: 283,867

[22] Filed: Dec. 13, 1988

[30] Foreign Application Priority Data

Dec. 14, 1987 [JP] Japan ............................... 62-315643
Jul. 26, 1988 [JP] Japan ............................... 63-185793

[51] Int. Cl.$^5$ ........................ B32B 5/16; B32B 15/08
[52] U.S. Cl. ............................ 428/323; 277/235 B; 428/324; 428/325; 428/332; 428/339; 428/463; 428/465
[58] Field of Search ............... 428/472, 463, 457, 332, 428/323, 324, 339, 465; 277/235 B, 234

[56] References Cited

U.S. PATENT DOCUMENTS

| | | | |
|---|---|---|---|
| 2,957,784 | 10/1960 | Schiefelbein | 428/472 |
| 4,210,567 | 7/1980 | Kosters | 428/344 |
| 4,402,518 | 9/1983 | Locacius | 277/235 B |
| 4,477,094 | 10/1984 | Tamamoto et al. | 277/235 B |
| 4,617,078 | 10/1986 | Takahashi et al. | 428/448 |

Primary Examiner—Thomas J. Herbert
Attorney, Agent, or Firm—Cushman, Darby & Cushman

[57] ABSTRACT

A rubber-coated gasket and method of forming the same is provided wherein a rubber layer is formed on one or both sides of the metal sheet, the rubber layer being formed of nitrile rubber containing a flaky filler and/or an alkyl titanate. The rubber layer which preferably has a thickness of 10–300 micrometers is bonded with a primer based on phenolic resin to the metal sheet. The additives and the rubber render it difficult for anti-freeze to penetrate through the rubber layer. In addition, the phenolic resin in the primer forms an anti-freeze-resistant network structure which maintains the integrity of adhesion between the metal substrate and the rubber layer even if the gasket is submerged in hot anti-freeze.

8 Claims, 1 Drawing Sheet

RUBBER-COATED GASKET

BACKGROUND OF THE INVENTION

1. Field of the Invention

The present invention relates to gaskets and more particularly to a rubber-coated gasket which includes a metal sheet having a rubber layer coated on one or both sides thereof. The rubbercoated gasket has such a high resistance to antifreezes that even if the gasket is exposed to an antifreeze, the rubber coating(s) will not separate from the metal sheet.

2. Description of The Related Art

Rubber-coated gaskets for use in various apparatuses and machines are known, generally, and are typically fabricated by punching or stamping desired shapes out of sheeting that consists of a metallic substrate such as a sheet of carbon steel, stainless steel or aluminum, with a rubber coating formed thereon. Rubber-coated gaskets have several advantages. In particular, because the substrate is formed from a high-strength metal sheet, the gasket will not allow any leakage of the internal gas under pressure. Further, the elastic surface rubber layer enables the gasket to closely fit the irregularities which may be found in the surface of a flange and thereby insures reliable gas sealing properties.

The structure of the a rubber-coated gasket of the type to which the present invention relates is shown in cross-section in FIG. 1. The prior art process for manufacturing such a gasket includes a series of steps. First, the metal sheet 1 is degreased and is then roughen by a suitable technique such as shot blasting or Scotch brightening. A chemical conversion coating 2 is then formed on the metal surface. A primer coating 3 is then formed as an adhesive layer by applying a primer based on a phenolic resin. The primer layer 3 is then coated with a given thickness of a rubber solution which is a mixture of nitrile rubber with a reinforcing carbon black filler, as well as a curing agent and other additive commonly used in rubbers. The coating solution is then dried and cured to form a rubber layer 4. Finally, depending upon the operating conditions of the gasket, a nonsticky layer 5 is formed on the rubber layer 4 by coating a dispersion of graphite, molybdenum disulfide, etc. (See for example U.S. Pat. No. 2,957,784).

As noted above, the convention process for forming rubber-coated gaskets includes using a phenolic resin based primer layer 3 which is overlaid with the nitrile rubber layer 4 using carbon black as a reinforcing filler. Since these gaskets have a high resistance to oils and Freon gases, they can be used with satisfactory results as gaskets for example in a compressor of a refrigerator. However, in automotive applications which is one of the more recently proposed uses of such gaskets, the primer layer 3 is corroded by hot antifreeze and the rubber layer 4 can separate from metal sheet 1. There are three major causes of this phenomenon. First, antifreezes are chiefly composed of ethylene glycol which is commonly used as a coating stripping agent. In addition, amines, phosphates and other compounds that are incorporated in antifreezes to, for example, inhibit corrosion, have a corrosive effect on the primer. Finally, antifreezes which are adjusted to a weekly alkaline state have, a pH of 8–9. However, the phenolic resin which is the chief component of the primer is decomposed by hot alkalines. Therefore, the phenolic resin can be decomposed by the hot antifreeze.

SUMMARY OF THE INVENTION

It is an object of the present invention to provide a rubber-coated gasket which is formed so as to have a high resistance to antifreeze.

The foregoing object is realized in accordance with the present invention by providing a rubber-coated gasket formed from a metal sheet with a layer of rubber formed on one of both sides thereof. The rubber layer is made of nitrile rubber containing a flaky filler and/or alkyl titanate. Each of the rubber layers has a thickness of 10–300 micrometers and is bonded to the metal sheet with a primer which is based on a phenolic resin.

Other objects, features and characteristics of the present invention as well as the methods of manufacture and economies of the various parts of the structure will become more apparent upon a review of the following detailed description with reference to the accompanying drawing and appended claims, all of which form a past of this disclosure.

DETAILED DESCRIPTION OF THE PRESENTLY PREFERRED EXEMPLARY EMBODIMENT

Figure 1:
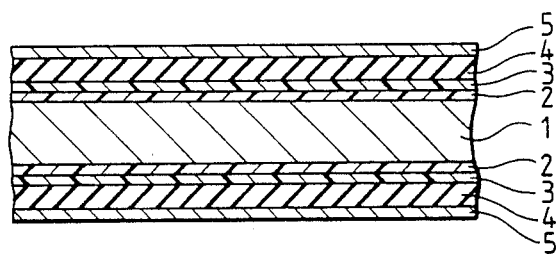
FIG. 1 is a cross-sectional view of a rubber-coated gasket structure to which the present invention relates.

The rubber-coated gasket provided in accordance with the present invention has a rubber layer formed on one or both sides of a metal sheet. The rubber layer is made of nitrile rubber containing a flaky filler and/or an alkyl titanate. The rubber layer(s) each have a thickness of 10–300 micrometers and are bonded to the metal sheet by a primer based on a phenolic resin. The gasket material of the present invention has the advantage that is either suppresses the penetration of an antifreeze through the rubber layer or markedly improves the resistance of the primer to antifreezes.

The flaky filler used in accordance with the present invention is an inorganic filler comprising flaky or tabular particles. An appropriate flaky filler may be for example talc, chlorite, sericite, mica, glass flakes, kaolin, graphite, aluminum flakes, aluminum diboride and nickel flakes. The inventors have found that a rubber layer containing such a flaky filler has an increased number of pathways for permeation by an antifreeze to thereby suppress its penetration through the rubber layer. In accordance with the most preferred embodiment of the invention, a flaky filler is used which has an average particle size of five micrometers and is incorporated in a rubber compound in an amount of 30–150 phr. Below 30 phr, the ability of the flaky filler to suppress the penetration of an antifreeze through the rubber layer is reduced. On the other hand, if the content of the flaky filler exceeds 150 phr, adhesiveness in the normal state will deteriorate.

Carbon black also influences the suppression of the penetration of an antifreeze through the rubber layer. In the case of MT black, its content generally ranges from 20 to 150 phr, preferably from 40 to 100 phr. As is apparent from the proposed ranges, MT black needs to be added in smaller amounts than would be necessary in the prior art process wherein no flaky fillers are employed. Further, the above amounts are preferred because if the content of MT black is below 20 phr, its ability to reinforce rubber is reduced and if the amount MT black is above 150 phr, the rubber layer will be unable to suppress the penetration of antifreeze even in the presence of a flaky filler.

If a carbon black finer then MT black is used as a reinforcing agent, its content must be lower than that of MT black. Thus, the content of carbon black may be determined in empirically. It should be noted, however, that the rubber layer must have a thickness of 10–300 micrometers. Indeed, if the thickness of the rubber layer is below 10–300 micrometers, then it is insufficient to insure the complete prevention of penetration of antifreeze through the rubber layer. If the rubber is thicker then 300 micrometer, the heat resistance of a gasket will deteriorate Examples of the alkyl titanate that can be used in accordance with the prevent invention include chelate compounds of tetraalkoxytitanium such as di-i-propoxy-bis(acetylacetonato)titanium, di-n-butoxy-bis(triethanolaminato)titanium, dihydroxy-bis(lactato)titanium and titanium-i-propoxyoctylene glycolate; and titanium esters such as tetra-i-propoxytitanium, tetra-n-butoxytitanium, and tetrastearoxytitanium. These alkyl titanates form a network structure by reacting OH groups in the phenol resin in the primer in accordance with the following scheme:

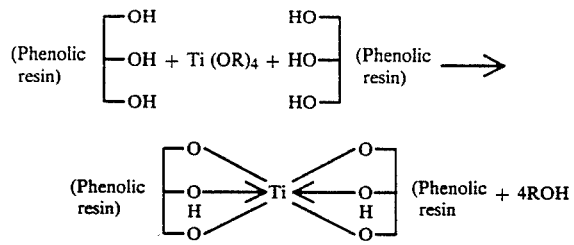

An important aspect of the present invention resides in the fact that the inventors have found that the network structure formed by reaction of an alkyl titanate with the phenolic resin in less likely to be decomposed by antifreezes when compared with networks formed by ordinary crosslinking reactions of phenolic resin including their reaction with hexamethylenetetramine, triethanolamine or other curing agents, and the dehydrative condensation reaction of phenolic resins themselves. Another important aspect of the present invention resides in adding an alkyl titanate not directly to a primer containing a phenolic resin, but to a coating composition for the rubber layer to be formed in contact to the primer layer. If an alkyl titanate is directly added to the primer, all of the OH groups in the phenolic resin that contribute to adhesion to the metal substrate will be exhausted and the intended adhesion to the metal substrate is not attainable.

To avoid such a problem, the primer is first bonded to the metal substrate by heat-curing it to a partly cross-linked state prior to rubber coating. Then, the excess OH groups, that is those which have not contributed to the bonding of the primer are allowed to react with an alkyl titanate in the rubber coating composition during curing so as to form an antifreeze-resistant network structure in the primer. The content of the alkyl titanate in the rubber coating composition is preferably in the range of from 0.5 to 50 parts, and most preferably from 2 to 20 parts, per 100 parts of the solids content in a rubber compound so that a rubber layer formed from the so adjusted rubber composition has a thickness of 10–300 micrometers. If the layer is thinner than 10 micrometers, the amount of an alkyl titanate available is insufficient to form a desired network structure in the primer. On the other hand, if the thickness of the rubber layer exceeds 300 micrometers, the heat resistance of the gasket, as noted above, will decrease.

If the addition of a flaky filler which suppresses the penetration of an antifreeze through the rubber layer is combined with the incorporation of the alkyl titanate in the rubber coating composition, which helps to provide formation of an antifreeze-resistant network structure in the primer, a synergistic effect is obtained. More particularly, the overall resistance to antifreeze that is achieved is greater than that achieved by the addition of either the flaky filler or the alkyl titanate alone.

Metal sheets that can be used as the substrate in accordance with the present invention include not only cold-rolled steel sheets but also carbon steel sheets, alloyed steel sheets, stainless steel sheets, aluminum and aluminum alloy sheets, copper and copper alloy sheets, and plated sheets thereof. The thickness of these metal substrates varys with the specific characteristics required of the gasket which is to be formed therewith and is generally in the range of 0.1–1.6 mm.

The phenolic resin used as the chief component of the primer may be, for example, either novolaks or resoles. In addition to purely phenolic resins, modified phenolic resins including cresol-modified, cashew-modified, alkylbenzene-modified and furan-modified phenolic resins can be used as well.

The following are examples of the present invention so as to further illustrate the method of the invention and the advantageous rubber-coated gaskets formed thereby. However, the following examples should in no way be considered limiting.

EXAMPLE

A cold-rolled steel sheet 0.3 mm thick was provided. The surface of the steel sheet was degreased with an alkali and then roughened by a Scotch brightening method. A corrosion-resistant iron phosphate coating was then formed on the sheet's surface by a phosphate conversion process. While alkali degreasing was used in this example, other methods of degreasing such as solvent degreasing, electrolytic degreasing, ultrasonic cleaning and steam cleaning can also be employed in accordance with the present invention. Furthermore, the roughening method is not limited to Scotch brightening, as noted above, but may include sand blasting, shot blasting, grit blasting and polishing with sand paper. Further, suitable chemical conversion processes include not only phosphating, suitable for application to coldrolled steel sheets, but also chromating which is suitable for aluminum sheets, oxalating which is suitable for stainless steel sheets, and plating with zinc or copper which are easy to bond. Finally, because the present invention provides a good adhesion between the metal substrate and the rubber coating, there is no particular need to perform a chemical conversion process if the metal substrate is a stainless steel sheet.

Following the formation of an iron phosphate coating, a primer having 9 wt % of a phenolic resin and 6 wt % of an NBR compound for primer dissolved in 85 wt % of a 9:1 methyl ethyl ketone and methyl isobutyl ketone was coated on both sides of the steel sheet with a reverse roll coater. By heating in an oven at 150° C. for about 2 minutes (the preferred heating range being 130°–180° C. for 1 to 10 minutes), a primer coating was formed on both sides of the steel sheet. The NBR compound was incorporated in the principal phenolic resin component in order to impart sufficient flexibility for drawing purposes. The preferred ratio of phenolic resin to NBR compound is in the range of from 8:2 to 4:6 and more preferably at 6:4. The solids content of the resin blend was adjusted to 10-25 wt % with the aid of a ketone-based solvent. The NBR to be incorporated in the primer may be replaced by carboxylic NBR or chlorinated rubber.

| Formulation of NBR Compound for Primer | |
|---|---|
| Nitrile rubber | 100 (phr) |
| Zinc white | 3-10 |
| Stearic acid | 0.3-1.5 |
| MT black | 100-200 |
| Coumarone-indene resine | 20-60 |
| Antioxidant | 1-7 |
| Sulfur | 0.5-4 |
| Cure accelerator | 1-7 |

A rubber coating solution was then applied to the resulting primer layer using a knife coater. The rubber coating solution contained 40 wt % of an NBR compound for rubber coating (for its composition, see below) and 3 wt % of di-n-butoxy-bis(triethanolaminato)-titanium dissolved in 57 wt % of a 3:1 mixed solvent of toluene and propyl acetate. The viscosity of this coating solution was adjusted to 2,000-3,000 cps, which may be reduced if a reverse roll coater is to be used instead of a knife coater. The applied coating was dried at 70° C. (preferably in the range of 60°-130° C.) for 30 minutes to evaporate the solvent. By curing at 180° C. for 20 minutes (the preferred curing conditions being 160°-250° C.×5-30 minutes), a rubber layer with a thickness of 20 micrometers per side was formed on both sides to make a rubber-coated gasket material having a total thickness of 0.36 mm.

| Formulation of NBR Compound for Rubber Coating | |
|---|---|
| Nitrile rubber | 100 (phr) |
| Zinc white | 3-15 |
| Stearic acid | 0.5-1.5 |
| MT black | 20-150 |
| Coumarone-indene resine | 2-15 |
| Antioxidant | 1-10 |
| Wax | 1-10 |
| Talc (flaky filler) | 30-150 |
| Sulfur | 0.5-4 |
| Cure accelerator | 1-7 |

EXAMPLES 2-11

Samples of rubber-coated gasket material were produced as in Example 1 except for the points noted under "composition" in Table 1, below. The non-sticky surface layer had a thickness of about 2 micrometers per side and was formed by coating the rubber layer with a dispersion of graphite in a paraffin wax binder and by subsequently drying the applied coating. The non-sticky agent that can be used in the present invention is not only the graphite used in Examples 1-11 but also molybdenum disulfide. The binder also is not limited to paraffin wax and other materials such as acrylic resins, phenolic resins and polyethylene can also be used.

PRIOR ART EXAMPLE

A prior art sample was prepared by repeating the procedures of Example 1 except that neither alkyl titanate nor flaky filler was employed. The samples of rubber-coated gasket material prepared in Examples 1-11 and the Prior Art Example were immersed in undiluted genuine antifreezes available from eleven car manufacturers for 70 hours at 130° C. After wiping off the antifreezes with acetone-impregnated cotton gauze, a grid pattern of 100 squares 1 mm apart was cut through the rubber coating. An adhesive tape was applied over the cross-hatched area and quickly pulled off (a sample fails the anti-freeze test if any one of the squares in the grid is pulled off). The results shown in Table 1 were the same for all genuine antifreezes used in the test.

TABLE I

| Composition | Examples | | | | | |
|---|---|---|---|---|---|---|
| | 1 | 2 | 3 | 4 | 5 | 6 |
| Type of metal sheet | cold-rolled steel sheet | aluminum sheet | SUS 301 sheet | SUS 304 sheet | SUS 301 sheet | SUS 301 sheet |
| Thickness of metal sheet (mm) | 0.30 | 0.40 | 0.20 | 0.25 | 0.20 | 0.25 |
| Method of roughening the surface of metal sheet | Scotch brightening | untreated | Scotch brightening | Scotch brightening | untreated | shot blasting |
| Chemical conversion process | phosphating | chromating | untreated | untreated | zinc plating | untreated |
| Type of alkyl titanate | di-n-butoxy-bis (triethanol-aminato) titanium | Ti-i-pro-poxyoctylene glycolate | di-i-propoxy-bis (acetylacetonato) titanium | dihydroxy-bis (lactato) titanium | di-i-propoxy-bis (acetylacetonato)-titanium | tetra-n-butoxy-titanium |
| Amount of alkyl titanate added (phr) | 7.5 | 7.5 | 7.5 | 7.5 | 7.5 | 3 |
| Type of flaky filler | talc | chlorite | sericite | mica powder | glass flake | sericite |
| Non-sticky surface layer | none | graphite base | graphite base | graphite base | graphite base | graphite base |
| Cure conditions | 180° C. × 20 min. | 200° C. × 15 min | 240° C. × 10 min | 240° C. × 10 min | 240° C. × 10 min | 220° C. × 15 min |
| Thickness of rubber layer for one side (m) | 20 | 40 | 30 | 100 | 30 | 50 |
| Total thickness of gasket material (mm) | 0.36 | 0.50 | 0.28 | 0.47 | 0.28 | 0.37 |
| Characteristics | | | | | | |
| Antifreeze immersion | 0 | 0 | 0 | 0 | 0 | 0 |

TABLE I-continued test (130° C. × 70 h)
No. of squares
pulled off

| Composition | Examples 7 | 8 | 9 | 10 | 11 | Prior Art Example |
|---|---|---|---|---|---|---|
| Type of metal sheet | cold-rolled steel sheet | cold-rolled steel sheet | cold-rolled steel sheet | copper sheet | cold-rolled steel sheet | cold-rolled steel sheet |
| Thickness of metal sheet (mm) | 0.25 | 0.60 | 0.40 | 0.30 | 0.25 | 0.30 |
| Method of roughening the surface of metal sheet | polishing with sand paper | Scotch brightening | shot blasting | polishing with sand paper | Scotch brightening | Scotch brightening |
| Chemical conversion process | phosphating | phosphating | phosphating | untreated | phosphating | phosphating |
| Type of alkyl titanate | di-i-propoxy-bis (acetylacetonato) titanium | none | tetrastearoxytitanium | tetra-i-propoxytitanium | di-i-propoxy-bis (acetylacetonato)-titanium*1 | none |
| Amount of alkyl titanate added (phr) | 15 | — | 10 | 5 | 6 | — |
| Type of flaky filler | none | sericite | chlorite | talc | none | — |
| Non-sticky surface layer | graphite base | graphite base | none | none | graphite base | graphite base |
| Cure conditions | 200° C. × 15 min | 180° C. × 25 min | 220° C. × 10 min | 200° C. × 20 min | 180° C. × 15 min | 180° C. × 20 min |
| Thickness of rubber layer for one side (m) | 40 | 140 | 60 | 40 | 40 | 20 |
| Total thickness of gasket material (mm) | 0.35 | 0.90 | 0.54 | 0.40 | 0.35 | 0.36 |
| Characteristics |  |  |  |  |  |  |
| Antifreeze immersion test (130° C. × 70 h) No. of squares pulled off | 3 | 10 | 0 | 0 | 0 | 100 |

*1 Alkyl titanate was used in combination with a silane-based coupling agent (γ-aminopropyl trimethoxysilane, 6 phr).

As is apparent from the foregoing, by providing a rubber-coated gasket material in accordance with the present invention containing a flaky filler and/or an alkyl titanate in the rubber layer, it is difficult for antifreezes to penetrate through the rubber layer. In addition, the phenolic resin with primer forms an antifreeze-resistant network structure which maintains the integrity of adhesion between the metal substrate and the rubber layer even if the gasket is submerged in hot antifreeze. The present invention provides the additional advantage that is enables the manufacture of gasket materials wherein a rubber is directly bonded to the surface of stainless steel sheets which have been considered to be difficult to bond unless some special chemical conversion treatment is applied.

While the invention has been described in connection with what is presently considered to be the most preferred embodiments, it is to be understood that the invention is not to be limited to the disclosed embodiments but, on the contrary, is intended to be limited only by the amended claims.

What is claimed is:

1. A rubber-coated gasket comprising:
   a metal sheet;
   a rubber layer formed on at least one side of said metal sheet, said rubber layer comprising nitrile rubber containing at least one of a flaky filler and an alkyl titanate; and
   a primer based on a phenolic resin bonding said rubber layer to said metal sheet.

2. A rubber-coated gasket as in claim 1, wherein said rubber layer has a thickness of 10–300 micrometers.

3. A rubber-coated gasket as in claim 1, wherein there is a rubber layer bonded to both sides of said metal sheet.

4. A rubber-coated gasket as in claim 1, wherein said flaky filler is selected from the group consisting of talc, chloride, sericite, mica, glass flakes, kaolin, graphite, aluminum flakes, aluminum diboride, and nickel flakes.

5. A rubber-coated gasket as in claim 4, wherein said flaky filler has an average particle size of 5 micrometers and is incorporated in the nitrile rubber in an amount of 30–150 phr.

6. A rubber-coated gasket as in claim 1, wherein the alkyl titanate is selected from the group consisting of chelate compounds of tetraalkoxytitanium and titanium esters.

7. A rubber-coated gasket as in claim 6, wherein the chelate compounds of tetraalkoxytitanium are selected from the group consisting of di-i-propoxy-bis-(acetylacetonato)titanium, di-n-butoxy-bis(triethanolaminato)titanium, dihydroxy-bis(lactato)titanium and titanium-i-propoxyoctylene glycolate.

8. A rubber-coated gasket as in claim 6, wherein the titanium esters are selected from the group consisting of tetra-i-propoxytitanium, tetra-n-butoxytitanium, and tetrastearoxytitanium.

* * * * *